Figure 1:
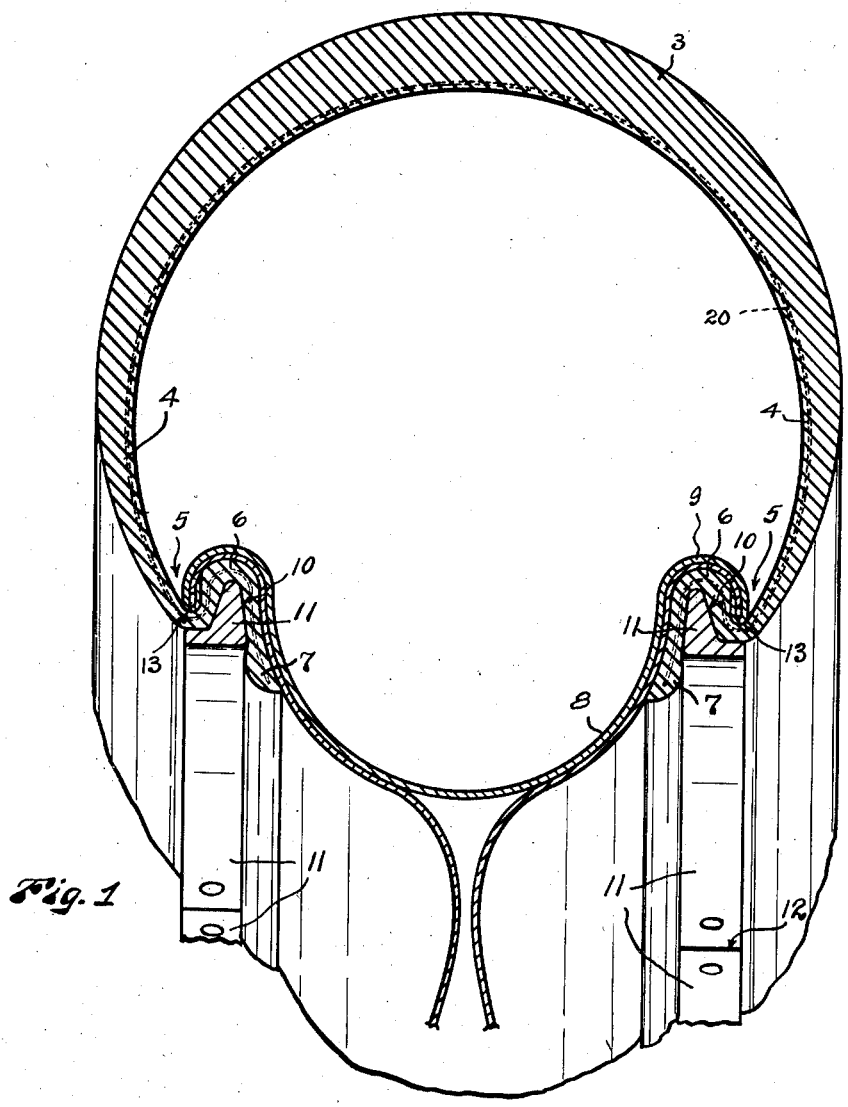

July 25, 1933.  A. H. SHOEMAKER  1,919,910
PNEUMATIC TIRE AND RIM CONSTRUCTION

Filed Sept. 9, 1930

INVENTOR
Alvin H. Shoemaker
BY
Fred C. Matheny
ATTORNEY

Patented July 25, 1933

1,919,910

UNITED STATES PATENT OFFICE

ALVIN H. SHOEMAKER, OF SEATTLE, WASHINGTON

PNEUMATIC TIRE AND RIM CONSTRUCTION

Application filed September 9, 1930. Serial No. 480,665.

My invention relates to improvements in pneumatic tires of the type disclosed in my co-pending application Serial Number 357,875, Filed April 24, 1929, in which the tread portion of the tire is maintained in a compressed condition while in use, and the primary object of my present invention is to provide a tire which may be manufactured without the usual inelastic bead rings and which may be handled and marketed in this same condition and in which the edges of the tire, when in use, are secured to the rim by holding means which forms a part of the rim and by which the diameter of the tire is reduced when the tire is applied to the rim to thereby maintain the tread portion of the tire in a compressed condition.

In the manufacture of tires the provision of the usual non-elastic bead rings in the edges of the tire increases the cost of production by making the tire more difficult to mold, and the provision of these bead rings also makes the tire more stiff and bulky and cumbersome to handle in marketing. It is an object of my present invention to terminate the side edges of the tire in bead portions which are formed of the same elastic materials as the tires and to provide means in connection with the wheel rims for securing these elastic bead portions to the rims.

When the tires are made and vulcanized without the usual non-elastic bead rings in the edges thereof it not only cheapens the cost of production of the tire but makes it possible to contract or reduce the diameter of the tire and hold the same to the smaller diameter when the tire is on a wheel, thereby compressing the rubber in the tire, increasing the density of said rubber, producing a tire in which external cuts will tend to close up rather than open up, making the tire more resistant to puncture and self sealing in the event of puncture, and generally increasing the wearing qualities of the tire.

My method of producing these tires is to construct the tires oversize and after they have been put through the vulcanizing process to reduce the size of the tire by drawing in on the same as the location of the beads thus putting the rubber or elastic material of the tire under compression or increasing the density of the same. The degree to which the density is increased will depend on the amount the tire is reduced in diameter, it being preferably to increase the density enough to leave the rubber under compression when the tire in inflated but it being possible to increase the density only enough to offset or partially offset the stretching due to inflation when the tire is put into service. The usual tire has a normal and natural density when not inflated and is stretched by inflation so that a cut made in the outer wall of the same will tend to open up. In my present tire the rubber may actually be in a compressed state after the tire is applied and inflated so that any cut or puncture will tend to close up and remain closed and the wearing qualities of the tire increased, it being evident that rubber in a compressed state will have greater wearing qualities than the same rubber will when used under tension or in a stretched condition.

In my copending application hereinbefore referred to, I disclose a method of maintaining a tire of this nature in a compressed condition by permanently attaching a non-elastic bead after the tire has been molded or vulcanized. In my present application I disclose a method of, and means for, doing away with the permanent non-elastic bead entirely and for clamping and holding the edges of the tire to the rim when the same is put on, the tire being made larger than the rims for which they are intended and being reduced in diameter when they are applied to said rims.

Another object of this invention is to provide a tire which cooperates with an air tight rim in such a manner that the usual inner tube may be dispensed with.

Other and more specific objects of my invention will be apparent from the following description taken in connection with the accompanying drawing.

In the drawing Figure 1 is a cross section of a tire and rim constructed in accordance with my invention showing parts in elevation.

Figure 2:
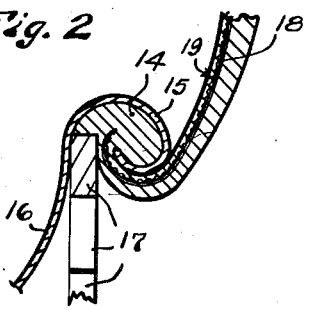

Fig. 2 is a fragmentary cross section of a modified form of the same.

Referring to Fig. 1, I show a pneumatic tire embodying a tread portion 3 and two oppositely disposed side walls 4 each of which terminate in bead portions of the same material as the tire and preferably molded to the shape shown to afford a groove portion 5, a rounded portion 6 which extends back into the tire and an edge portion 7 which is arranged to lie against the outer side of a deep channeled or arcuately recessed rim 8.

The edges of the rim are reversely curved as at 9 to afford grooves or channels of semicircular cross section for the reception of the rounded portions 6 on the inner edges of the tire and it will be noted that the tire edges extend over the outside of the rim instead of inside of rim flanges as is common practice. The tire bead portions are shaped to form an annular groove 10 for the reception of an expansible locking ring 11 which is inserted after the tire is in place to securely lock the tire to the rim. This locking ring is preferably split as at 12 whereby the ends of the same may be overlapped to contract the ring and facilitate insertion of the same and may then be expanded so that the ends abut against each other and the edges of the tire are firmly secured in place. The locking ring 11 may be of approximately L shaped cross section and has a wedge like portion which fits into the edges of the tire in such a manner as to make contact with the tire without touching the rim at any place. All metal to metal contact is thus avoided.

When the tire is inflated it will be drawn very tightly into contact with the rim especially where it passes under the rounded edge 13 of said rim thereby forming at this point an efficient air seal which will make it possible to use this tire without an inner tube.

This tire may be reinforced, preferably by cords 20 which extend radially of the tire but do not extend diagonally or longitudinally of the same.

In Fig. 2 I have shown an alternative construction of tire in which a bead 14 of elastic material, as soft rubber, is formed on the edge of the tire and is adapted to be inserted within a groove 15 formed in the edge of a rim 16 and a split locking ring 17 is inserted between the side of the rim and the edge portion 14 of the tire to hold the same in place. In this construction I preferably provide additional reinforcing means which may be in the form of cords 18 and fabric 19 embedded in that portion of the edge of the tire 14 which draws around the groove portion 15 of the rim. When this tire is inflated it draws very tightly against the rim forming an air seal which makes it possible to use this tire without a tube.

In both of the tires herein disclosed it is essential that all reinforcing means be fully embedded in rubber to prevent leakage of air when the tires are used without tubes.

I have found in practice that it is not difficult for a person of ordinary strength and without the use of special tools to apply a tire of this nature to a rim of smaller size than the tire in such a manner that the tire will be reduced in size substantially and the tread portion thereof will be placed under compression and will remain compressed after the tire is inflated. The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. In a tire and rim of the class described; a rim of substantially semicircular cross section affording a rim cavity for air, said rim having edges which are laterally curved outwardly and radially curved inwardly to afford grooves which open toward the axis of said rim, a tire having bead portions of pliable and elastic material extending inwardly past the outer sides of said curved rim edges and lying within said grooves, the width of said tire at the edges of said rim being greater than the depth of the air cavity of the tire when the tire is applied to the rim; reinforcing means embedded in said tire, said reinforcing means consisting of radially arranged cords which extend substantially crosswise of the tire from one bead portion to the other thereby forming a transverse binder and leaving the tire free to expand the contract longitudinally, and an expansible locking ring securing each bead portion of said tire within said groove, said tire bead portions each forming a double loop extending over the edge of said grooved rim portion and over said locking ring, the extremities of said tire bead portions lying between said rim and said locking rings.

2. In a tire and rim of the class described; a one piece annular tire having flexible and elastic bead edge portions free to stretch and contract; reinforcing means embedded in said tire, said reinforcing means consisting of radially arranged cords which extend substantially crosswise of the tire from one bead portion to the other thereby forming a transverse binder and leaving the tire free to contract and expand longitudinally; an arcuate rim having bead receiving edges which are curved outwardly in lateral directions and inwardly in radial directions to afford grooves which are open toward the axis of said rim for the reception of said tire bead portions, said bead receiving edges being of substantially smaller diameter than the bead portions of said tire, said tire bead portions extending over the outer edges of said rim and lying within said grooves, said tire being held to a reduced diameter and the elastic material of said tire being placed under compression when said tire is operatively engaged with said bead portions of said rim, the width of said tire at the edges of the rim being greater than the depth of the air cavity in the tire when the tire is on the rim, and an expansible locking ring securing each bead portion of said tire within said groove, said tire bead portions each forming a double loop extending over the edge of said grooved rim portion and over said locking ring, the extremities of said tire bead portions lying between said arcuate rim and the sides of said locking rings.

ALVIN H. SHOEMAKER.